United States Patent [19]

Meyzonnette et al.

[11] Patent Number: 4,887,310
[45] Date of Patent: Dec. 12, 1989

[54] IDENTIFICATION SYSTEM USING A LASER RETRO-REFLECTING AND MODULATING SET

[75] Inventors: Jean L. Meyzonnette, Jouy en Josas; Bertrand Remy, Meudon La Foret; Robert Pressiat, Ville D'Avray, all of France

[73] Assignee: Thomson CSF, Paris, France

[21] Appl. No.: 77,288

[22] Filed: Jul. 24, 1987

[30] Foreign Application Priority Data

Aug. 1, 1986 [FR] France .................. 86 11201

[51] Int. Cl.$^4$ .................................. H04B 9/00
[52] U.S. Cl. .................................. 455/604; 455/605; 455/607; 350/358
[58] Field of Search ............. 455/605, 603, 608, 609, 455/606, 604, 607; 350/358; 329/144; 356/349, 3, 4.5, 27; 332/7.5, 7.51

[56] References Cited

U.S. PATENT DOCUMENTS

| | | | |
|---|---|---|---|
| 3,055,258 | 9/1962 | Hurvitz | 332/7.51 |
| 3,383,627 | 5/1968 | Desmares | 332/7.51 |
| 3,984,686 | 10/1976 | Fletcher et al. | 356/4.5 |
| 3,989,942 | 11/1976 | Waddoups | 455/605 |
| 4,143,263 | 3/1979 | Eichweber | 455/606 |
| 4,443,066 | 4/1984 | Freyre | 350/358 |
| 4,466,738 | 8/1984 | Huang et al. | 356/349 |
| 4,662,003 | 4/1987 | Eichweber | 455/605 |

FOREIGN PATENT DOCUMENTS

| | | | |
|---|---|---|---|
| 0048540 | 3/1983 | Japan | 455/605 |
| 0132216 | 8/1983 | Japan | 350/358 |
| 2119109 | 11/1983 | United Kingdom | 350/358 |

OTHER PUBLICATIONS

Abbiss et al; "Deviation-Free Brayg Cell Frequency—Shifting;"*Applied Optics*; vol. 20; No. 4; Feb. 15, 1981; pp. 588–590.

Primary Examiner—Robert L. Griffin
Assistant Examiner—L. Van Beek
Attorney, Agent, or Firm—Cushman, Darby & Cushman

[57] ABSTRACT

The system comprises a laser transmitter/receiver set which transmits laser radiation and processes the radiation received by retro-reflection and a remotely-placed retro-reflecting and modulating set which modulates the laser radiation and sends it back to the receiver. These two sets are mechanically separated, and one can be placed on board an aircraft and the other on the ground, for example. The modulation is done by a frequency-controlled acousto-optical deflector to obtained the operating conditions of diffraction according to Bragg's law. The laser radiation, after crossing the deflector, is sent back by a catadioptric device along its original path. The double passage through the deflector, on the way out and back, produces a shift in the frequency of the laser radiation, the value of the said shift being equal to twice the control frequency of the deflector. A double axis or single axis optical scanning device is added on, for functioning in a wide field.

15 Claims, 5 Drawing Sheets

FIG_1

FIG_2

FIG_3_A

FIG_3-B

FIG_4

FIG_5

FIG_6

FIG_7

FIG_8

FIG_9

FIG_10-A

FIG_10-B

FIG_11

IDENTIFICATION SYSTEM USING A LASER RETRO-REFLECTING AND MODULATING SET

BACKGROUND OF THE INVENTION

1. Field of the Invention

The present invention relates to an identification system that uses a laser retro-reflecting and modulating set. The identification depends on the use envisaged for the system: it may be a measurement of the orientation of the laser beam with respect to a reference direction related to an illuminated object, or again it may pertain to the identification of the illuminated object.

2. Description of the Prior Art

The use of transmission means, working together to remotely illuminate a set that fulfils the functions of modulation and retro-reflection, is known in the prior art.

A solution of this type is described in the U.S. Pat. No. 4,134,008, which more especially emphasizes the making of a responser in a friend or foe identification system. According to this type of approach, an electro-optical modulator, such as an interference optical filter or a PLZT electro-optical switch is associated with a mirror to create the desired functions. In these methods, the re-transmitting part is combined with a receiver, itself designed to identify the already-encoded laser wave that is received.

According to another known method, described in the French patent No. 2 433 760, an object illuminated by a laser wave comprises retro-reflecting and modulating sets in which a PLZT ceramic is associated with a catadioptric device, such as a reflecting corner cube. The application envisaged is more especially the detection and location of an object and the spatial identification of directions related to the object.

An aim of the present invention is to propose another method for the retro-reflection and modulation of the laser beam, a method which, through the parameters brought into play, can be used in a variety of applications.

3. Summary of the Invention

In accordance with the present invention, there is provided an identification system using a laser beam retro-reflecting and modulating device, the said system comprising a laser transmitter/receiver which is mechanically separate and is placed remotely from a retro-reflecting and modulating set, the transmitter producing a radiation in the direction of the said set and the receiver comprising circuits for the detection and processing of the laser rays modulated and sent back by retro-reflection. The retro-reflecting and modulating set comprises an acousto-optical deflector which periodically receives an electrical signal from a control circuit. The frequency of the said electrical signal can be adjusted to obtain the diffraction of the beam in accordance with the operating conditions of Bragg's law. The deflector is mechanically coupled with a catadioptric device placed downstream to send back the diffracted laser radiation in the same direction and, after this radiation has passed through the deflector in the reverse direction, to produce the retro-reflection of the beam towards the transmitter/receiver, the retro-reflected wave having a frequency shift with a value equal to twice the frequency of the said control signal.

BRIEF DESCRIPTION OF THE DRAWINGS

The special features and advantages of the invention will be seen in the following detailed description, given as an example and made with reference to the appended figures, of which.

DESCRIPTION OF THE PREFERRED EMBODIMENTS

Figure 1:
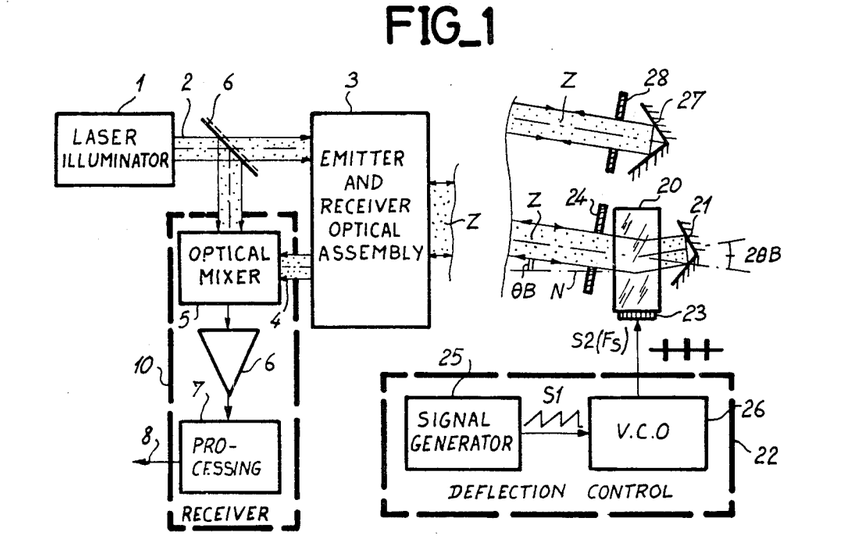
FIG. 1 is a diagram of an identification system according to the invention.

Referring to the diagram of FIG. 1, the system comprises a transmitter/receiver set with a laser transmitter 1 which gives a transmission beam 2, which is transmitted through an exit optical unit 3 representing the optical system for the transmission and reception of the laser waves backscattered by the illuminated objects. The received wave 4 is applied to an optical mixer 5 of the receiver device 10 which further receives a local wave at the transmitted laser wave frequency, it being possible to produce the said wave as indicated by means of a semi-reflecting glass 6 which makes it possible take up a fraction of the laser transmission 2. The optical mixer 5 delivers the corresponding beat in the form of an electrical signal, and this beat is applied to the processing circuits 7 after amplification. The processing circuits deliver the data to be exploited at 8. This laser transmitting/receiving set can be installed, for example, on board an aircraft while the remaining part of the system (shown at the right-hand side of the figure) is set on the ground, for one of the envisaged applications of the invention. This part on the ground comprises a set for the modulation and retro-reflection of the transmitted laser wave that reaches it. The modulation is obtained with an acousto-optical deflector 20 which is electrically controlled by a signal S2 with a frequency which can be set to obtain, for a value $F_S$, the operating conditions of diffraction according to Bragg's law. According to these conditions, the incident radiation is diffracted by the deflector and is almost entirely recovered at the exit. Additionally, a catadioptric device 21, set downstream of the deflector 20, a refecting corner cube for example, makes it possible to send back the radiation by retro-reflection in the direction Z of the initial path. The diffracted radiation again crosses the deflector 20 under the same operating conditions and is sent back in its original direction towards the transmitter/receiver set. The part 22 represents the deflector control circuits used to produce the signal S2, applied to a piezo-electric element 23. This element 23 produces sound vibrations at the frequency $F_S$ of the control signal S2, and these sound vibrations are transmitted through the photo-elastic optical medium of the deflector 20. As shown in the figure, the control circuits of the deflector may comprise, as shown, a generator 25 of saw-toothed signals S1 which are applied to a voltage-controlled oscillator 26 which delivers the signal S2.

Figure 2:
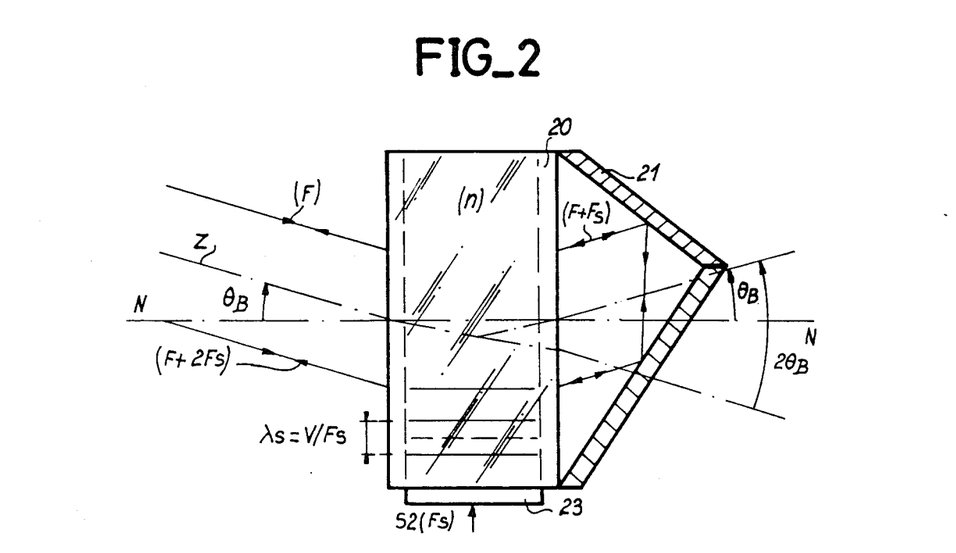
FIG. 2 is a partial diagram of the laser beam retro-reflecting and modulating set.

FIG. 2 recalls the functioning of the deflector and depicts this functioning with the associated catadioptric device when the diffraction conditions of Bragg's law are present. Acousto-optical deflection is based on the propagation of a sound wave through a refractive medium. This propagation causes a synchronous, wave-like disturbance in the refractive index of this medium, the cause of this disturbance being the modulation given to the local density of the matter by the local distribution of pressures (Brillouin effect).

FIG. 2 shows the phenomenon of interaction between the incident laser light plane wave and a travelling, sine plane wave in the photo-elastic medium 20. This medium behaves like an optical array and, under certain condition, it has the property of diffracting the light wave. For these conditions, known as the diffraction conditions of Bragg's law, there is only one diffracted beam at the exit. From the optical point of view, corresponding to a travelling wave with a frequency $F_S$, there is a phase grid with a pitch equal to $V/F_S$, V being the speed of acoustical propagation in the medium forming the deflector 20. For the value $F_S$, corresponding to the Bragg diffraction, we have the equation:

$$\sin \theta_B = \lambda F_S / 2V$$

where $\theta_B$ is the angular displacement between the axis of the incident laser beam and the normal line to the deflector, $\lambda$ is the wavelength of the laser radiation and V is the speed of acoustical propagation in the photo-elastic optical medium.

The frequency F of the laser beam undergoes a first increase in frequency $F_S$ after diffraction in the medium 20. Then, it undergoes a second increase $F_S$ on its return, after retro-reflection, by the element 21 and after making another passage in reverse along the same path, through the medium 20. Hence, at reception, it suffices to measure the frequency shift $2F_S$ between the transmitted beam and the received beam to deduce (according to the formula referred to above) the divergence $\theta B$ of the axis of the beam with respect to the reference direction N normal to the deflector.

Figure 7:
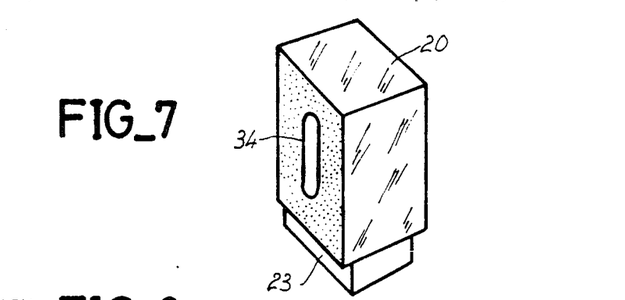
FIG. 7 is a diagram relating to the acousto-optical deflector showing the entry window.

The embodiment of FIG. 1 makes it possible to cover a small field. The transmitter/receiver can be carried by a moving support, the transmitter delivering a laser beam, for example infra-red at 10,6 microns. It is sought, for example, to ascertain the direction of this beam with reference to the normal N. Owing to motion with respect to the deflector and retro-reflecting system set on the ground, the laser beam with a frequency F undergoes a Doppler shift which must be taken into account. A second catadioptric device 27, arranged like the first catadioptric device 27, is provided to send back the laser beam by retro-reflection in the direction Z, also without any other modification, so as to give a reference and obtain, at reception, the modification caused solely by the Doppler shift. The elements 24 and 28 correspond to diaphragms. In particular, the diaphragm 24 is adapted to the shape of the entry window 34 of the deflector 20 (FIG. 7).

Figure 3:
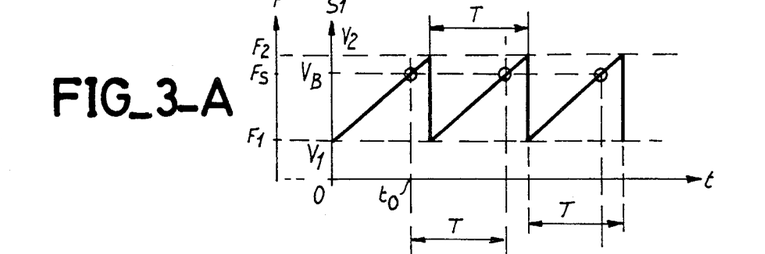
FIGS. 3A and 3B are waveforms of the deflector controlling signals.

According to the embodiment of the control circuits 22 of FIG. 1, the deflector is periodically excited at a frequency $F_S$ along the curve S2 depicted in the FIG. 3B, FIG. 3A representing the saw-teeth forming the oscillator 26 controlling signal S1 and the corresponding frequency excursion F1 to F2 with a period T. The value VB of S1 corresponds to the transmission at the frequency $F_S$ meeting the conditions of Bragg's law, and this value is reproduced at the period T. By comparing the beams sent back by the device 27 with the beams sent back by the set 20-21, it is possible to eliminate the Doppler parameter and to select the value $2F_S$ due to the assembly 20-21. This frequency comparison is done in the receiver 10 after mixing in 5 and the analysis of the beating waves by the processing circuit 7, using a spectrum analyzer.

The solution shown in FIG. 1 can be applied to the measurement, on an aircraft, of the angle between the aircraft-runway threshold direction and the horizontal plane. The modulator and retro-reflector devices 20-21,27 are set at the theoretical point at which the wheel touches the runway, the normal N to the deflector being at the intersection between the horizontal plane and the vertical plane containing the axis of the runway. The available range of measurement is small, about 1 to 5 degrees, but it is enough for this type of application. However, to get a measurement with a greater image angle, it is necessary to envisage a modified embodiment which is described with the help of the following figures.

Figure 4:
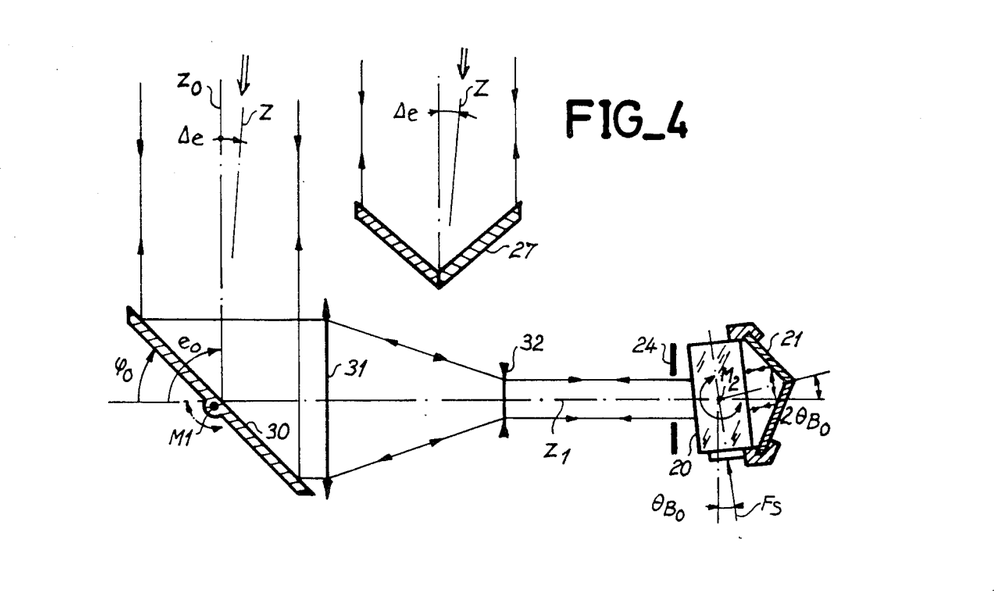
FIG. 4 is a diagram of an optical deflecting device fitted with an optical scanning device to cover a wider field.

The embodiment of FIG. 4 pertains to a scanning operation in the plane of the figure which represents, for example, an azimuthal angular field. The scanning device is made with a reflecting mirror 30 which rotates on a central axis perpendicular to the plane of the figure and shown by the point M1. An afocal optical system 31-32 adapts the diameter of the incoming flow to the entry window of the optical deflector 20. FIG. 7 shows an optical deflector with the entry window 34, the remaining part of the entry surface being made opaque. The lens 31 can be placed upstream of the mirror 30 and can rotate with it. The afocal optical system 31-32 limits the entry field of photo-elastic medium 20 in such a way that, as soon as the incoming beam from the laser transmitter/receiver diverges from the optical axis P by an determined limit angle of low value, this beam no longer penetrates the entry diaphragm 24. For the angular divergence at entry is multiplied by the enlargement ratio of the afocal system formed by the lenses 31 and 32. At the level of the photo-elastic medium 20, the angular divergence is further multiplied by the distance between the lens 32 and the entry plane of the medium 20. The direction $Z_O$ corresponds to the returning direction of the optical axis $Z_1$ of the afocal assembly 31-32. If the mirror 30 is made to rotate around the point M1 by an angle $\Delta\phi$, the direction in which the mirror points will be the direction Z, which diverges from the initial direction $Z_o$ by an angle $\Delta e = 2\Delta\phi$. A particular value of the frequency $F_S$ of the piezo-electric transducer is made to correspond to each value of divergence $\Delta\phi$, and the photo-elastic medium 20 is made to rotate on an axis M2, parallel to the axis M1 and positioned in the center of the medium, so that the optical beam between the lens 32 and the medium 20 always meets the diffraction conditions of Bragg's law. The rotation $\theta_{Bo}$ of the medium 20 makes it possible to verify the equation:

$$\sin \theta_{Bo} = \lambda F_S/2V$$

Thus, a mobile support possessing a laser transmitter/receiver can ascertain the angle $\Delta e$ made by its transmission beam with reference to the reference plane passing in the direction $Z_o$ and perpendicular to the plane of the figure, by measuring the frequency drift $2F_S$ after reception of the retro-reflected laser beam, as indicated above. A simple law can be chosen, for example, one such as $\Delta F = K\Delta e$, K being a coefficient of proportionality with $F_S = F_o + \Delta F$, $F_o$ being the initial frequency value for the reference beam shown in the figure. The ratio $\Delta\theta B/\Delta\phi$ of the transmission which must relate the rotation of the photo-elastic medium 20 on the axis M2 to the rotation of the mirror 30 on the axis M1 is given by the equation:

$$\frac{\Delta\theta_B}{\Delta\phi} = \frac{\lambda}{V} \cdot \frac{K}{\sqrt{1 - (\lambda F_o/2V)^2}}$$

The processing circuit 7 at reception makes it possible to extract the value $\Delta e = (F_S - F_o)/K$ after obtaining $2F_S$. When the remote transmitted laser beam arrives along the reference beam $Z_1$, and only in this case, it is sent back by the photo-elastic medium 20 and its associated retro-reflector through the rotation of this set on the axis M2 as defined in the previous equation.

Figure 5:
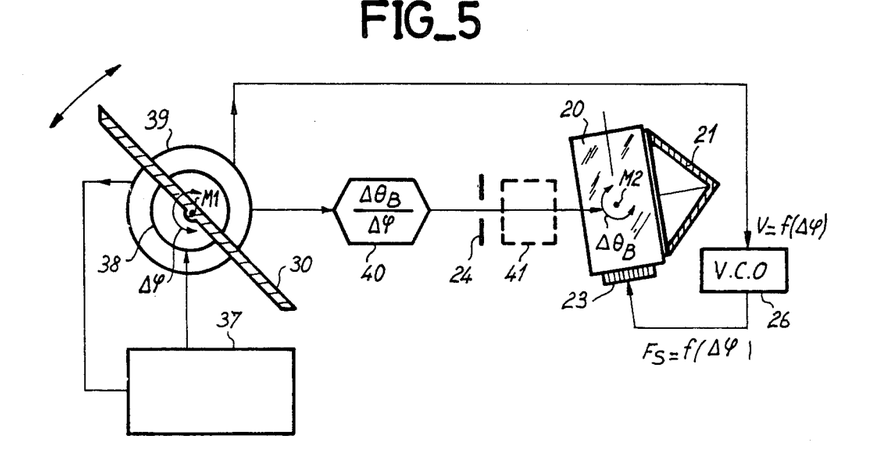
FIG. 5 is a diagram of the embodiment according to FIG. 3, with mechanical and electronic circuits to servo-link the optical deflector with the exploratory scanning motion.

The embodiment of this approach is shown schematically for the electronic part in FIG. 5. The scanning servo-link system comprises a servo-control circuit 37 which powers a motor 38 mounted on the axis M1. The rotation also drives an angle sensor 39 which gives the information of rotation to the servo-mechanism 37, as well as to the controlled oscillator 26. The rotation of the mirror is modified by the ratio $\Delta\theta_B/\Delta\phi$ referred to above, by means of a mechanical or electronic step-down unit 40. Thus we obtain the rotation $\Delta\theta_B$ of the medium 20-retro-reflector 21 assembly on the axis M2, corresponding to the rotation $\Delta\phi$ of the mirror and the control of the oscillator 26 is such that frequency $F_S$ is modified to meet the conditions of Bragg's law as and when the rotation occurs. During a scanning and searching stage, the mirror produces an excursion in an angular sector of a determined amplitude. This control can be done at a constant speed and can be obtained by a programming of the servo-mechanism 37.

It is observed that instead of making the photo-elastic medium 20 and its retro-reflector 21 rotate, the beam with the value $\Delta\theta_B$ can be made to deviate by any optical deviating device, a mirror or a prism assembly interposed between the diaphragm 24 and the entry of the deflector 20. This deviating device is symbolized by the block 41 drawn with dashes.

The entry window 34 (FIG. 7) of the photo-elastic medium 20 is generally rectangular and it is possible to provide for a cylindro-spherical afocal optical piece.

Figure 6:
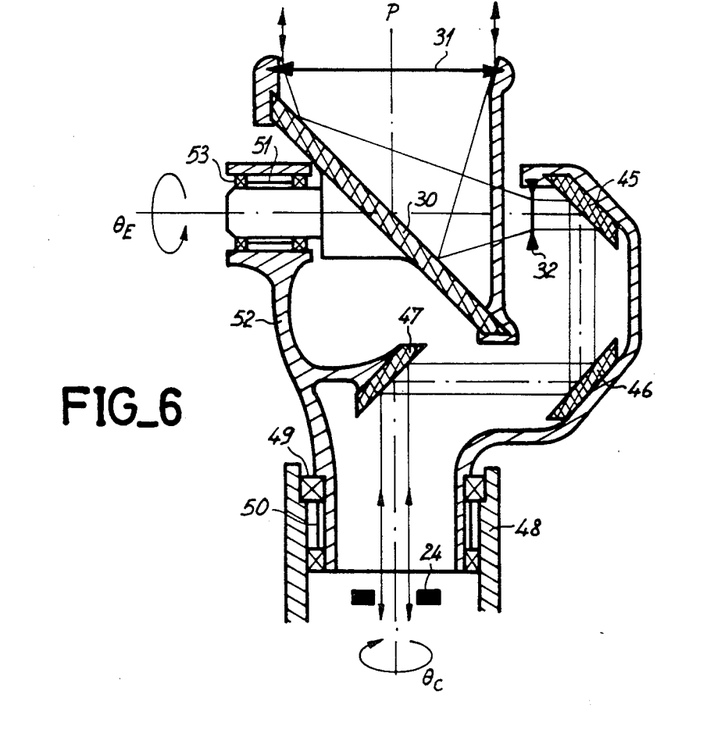
FIG. 6 is a diagram of an embodiment of an optical scanning head rotating around two axes.

The wide-field method described with reference to FIGS. 4 and 5 relates to the measurement of an angle in a plane. To extend this method to the measurement of a direction in space, a rotation on a second perpendicular axis, that of the elevation, should be added to the azimuthal excursion. For this purpose, the scanning head can be made according to the method of FIG. 6, given as an example. Spatial exploration is done according to two degrees of freedom, namely that of the axis $\theta_C$, driving the entire assembly in azimuth and that of the axis $O_E$ driving the mirror 30 and the lens 31 of the afocal assembly in elevation. The entry axis P is sent in the direction of the optical axis of the lens 32, and a set of three mirrors 45, 46 and 47 provides for the final return of this direction along the azimuthal axis of rotation $\theta_C$. The assembly is uncoupled from a frame 48 by means of bearings 49. The azimuthal or circular driving is done by a small-sized torque motor 50. Similarly, in elevation, the drive is provided by a torque motor 51 and the uncoupling from the frame 52 which supports the set is done by means of bearings 53. Angle rotation sensors are also associated with the torque motors.

Figure 8:
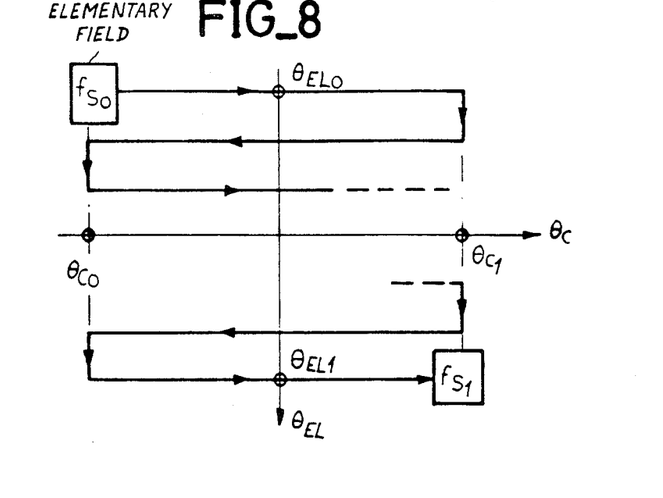
FIG. 8 is a diagram of a line-by-line scanning operation possible for an embodiment according to FIG. 6.

A law of correspondence must be defined between the frequency $F_S$ applied to the deflector 20 and the pair of angular rotation values $\theta_C$ in azimuth and $\theta_E$ in elevation. For example, we may consider a simple, linear principle of the increase in the frequency $F_S$ from an initial value $F_{So}$ to a final value $F_{S1}$. Considering a line-by-line azimuthal scanning operation with gradual variation in elevation, as recalled in FIG. 8, it is easy, on the basis of the detections of the angles $\theta_E$ and $\theta_C$ made with the sensors mounted respectively on the elevation axis and the azimuthal circular axis, to apply the appropriate commands to the controlled oscillator 26 by the frequency value $F_S$ given by the equation:

$$F_S = F_{So} + (F_{S1} - F_{So}) \cdot \frac{N}{N+1} \cdot \left( \frac{\theta_{EL} - \theta_{ELO}}{\theta_{EL1} - \theta_{ELO}} + \frac{R}{N} \right)$$

where N is the number of lines, counting these lines 0,1,2, ... and R is equal to $$\frac{\theta_C - \theta_{CO}}{\theta_{C1} - \theta_{CO}}$$

in the case of even-numbered lines 0,2 ... N and $$\frac{\theta_{C1} - \theta_{CO}}{\theta_{C1} - \theta_{CO}}$$

in the case of odd-numbered lines 1,2, ... N−1.

Figure 9:
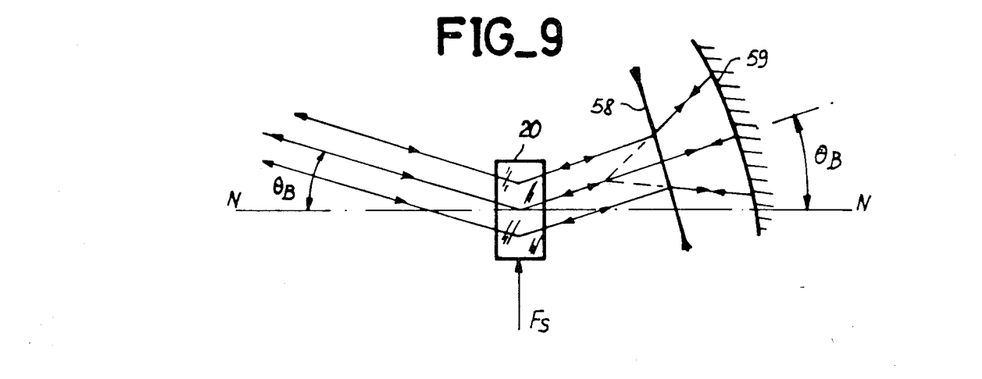
FIG. 9 is an alternative embodiment of the catadioptric device placed behind the acousto-optical deflector.

FIG. 9 shows an alternative embodiment of the catadioptric device placed downstream of the modulator 20. According to this solution, the catadioptric device is made with a divergent lens 58 and a spherical mirror 59, the center of curvature of which coincides with the focus of the lens. As previously, the set 58 and 59 is joined to the modulator 20 in the alternatives shown in FIGS. 4 to 6 where the set is driven in rotation.

Figure 10:
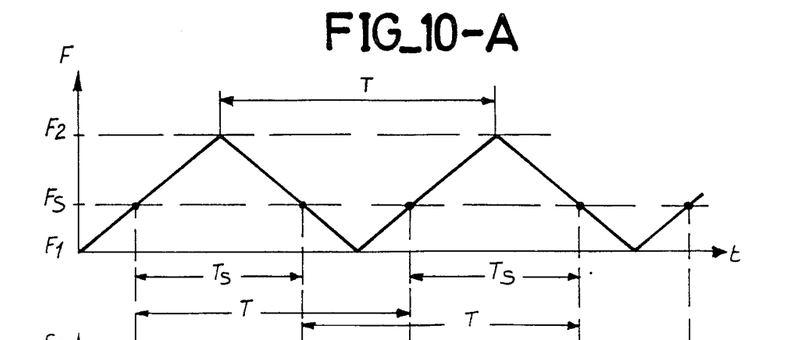
FIGS. 10A and 10B are waveforms of deflector-controlling signals and of the corresponding detected signals.

FIG. 10 shows an alternative system for actuating the controlled oscillator according to symmetrical saw-toothed waveforms (FIG. 10A), the frequency excursion occurring linearly from the value F1 to the value F2 for a duration T/2 and from the value F2 back to the value F1 during a second half-period T2. The signal detected SD (FIG. 10B) during the processing at reception comprises the frequency $F_S$ with an interval TS which is significant of the value $F_S$. The two corresponding successive signals detected are each produced at the period T. The measurement of the time TS (or better, that of the ratio TS/T) at reception makes it possible to identify the value $F_S$ and, consequently, the device can be simplified by eliminating the reference retro-reflector numbered 27–28 in the FIG. 1.

Figure 11:
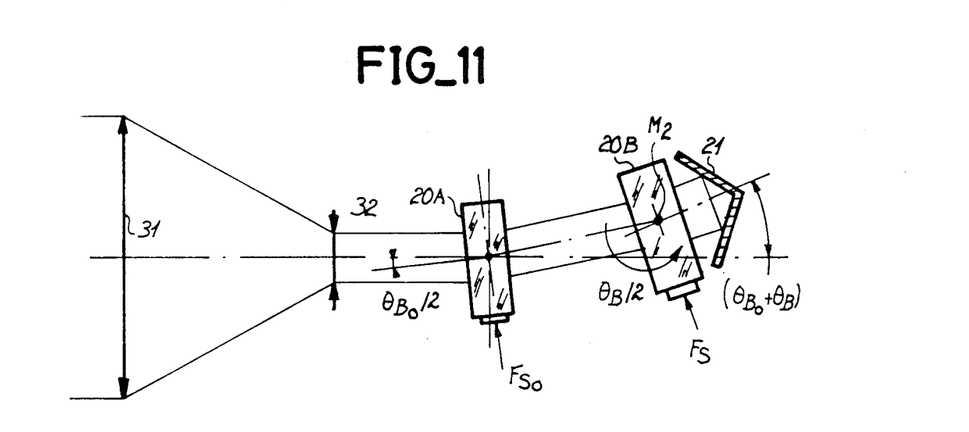
FIG. 11 is an alternative embodiment using two acousto-optical deflectors.

FIG. 11 relates to another alternative which can be used if the field explored (in a wide-field application) is such that the longest side of the window 34 of the deflector is too small to enable operating conditions that would fulfil the conditions of Bragg's law at the ends of the field of observation. This alternative solution proposes to use a set of two successive deflectors, the first one 20 having no associated retro-reflector and being supplied with a fixed frequency signal $F_{S_o}$ that gives the conditions of Bragg's law for an indicated angle $\theta_{B_o}$ and the second which is supplied with the value $F_S$ which varies according to the rotation of the entry axis during scanning.

The exit direction represents the sum $\theta_{B_o}$ due to the first assembly 20A and $\theta_B$ due to the second assembly 20B, $\theta_{B_o}$ being a constant value. The remote receiving device should take the frequency shifts $2F_{S_o}$ and $2F_S$ into account so as to interpret the measurement appropriately.

A device according to the invention can be applied to friend-foe identification, the laser transmitter/receiver being placed on the ground and the modulator/retro-reflector set being placed on the friendly aircraft to be identified. A turret according to FIG. 6 can be mounted on the friendly aircraft and pointed towards the transmitter/receiver by means of an ancillary control system. In the same way, a turret can be provided on the ground to point the transmitter/receiver towards the friendly aircraft detected by an attached system, a radar for example. The modulating device 20 is pointed in such a way that its normal N is oriented at an angle of $\theta_{B_o}$ with reference to the optical axis, to obtain the relationship of Bragg already referred to. The angle $\theta_{B_o}$ as well as the frequency $F_S$ can be modified according to the code in use. For this, a positioning servo-mechanism points the device 20 at the desired angle and an angle sensor monitors this rotation and sends the angle data also to the controlled oscillator which gives the excitation frequency $F_S$. Thus, when the friendly aircraft has pointed its acousto-optical device towards the ground transmitter/receiver, which is itself pointed at the aircraft, the ground transmits a laser beam at the frequency F and receives, in return, a beam at the frequency F increased by the Doppler shift and the increase $F_S$, this latter increase being measured and compared with the code in use.

What is claimed is:

1. A system of identification using a laser beam retro-reflecting and modulating device, said system comprising:
   a retro-reflecting and modulating set having an acousto-optical defector which periodically receives an electrical signal from a control circuit, of a frequency to obtain a diffraction of a radiation beam in accordance with operating conditions of Bragg's law, said deflector being mechanically coupled with a catadioptric device placed downstream to receive radiation beam and to send back a diffracted radiation beam in the same direction and, after this radiation has passed through the deflector in the reverse direction, to produce a retro-reflection of the radiation beam, the retro-reflection having a frequency shift with a value equal to twice a frequency of said control signal;
   a mechanically separate laser transmitter/receiver set which is placed remotely from said retro-reflecting and modulating set and receives said retro-reflection therefrom, the transmitter producing a radiation in the direction of said retro-reflecting and modulating set and the receiver comprising circuits for detection and processing of said retro-reflection sent back from said retro-reflection and modulation set; and
   an optical scanning device for scanning a determined range in one plane, comprising a rotating, reflecting mirror, rotating on an axis orthogonal to said one plane, wherein the retro-reflecting and modulating set is servo-linked to the rotation of the mirror according to a determined ratio of a type which (a) makes it possible to preserve the diffraction conditions of Bragg's law, and (b) makes it possible to determine a deviation from a reference plane.

2. A system according to the claim 1, further comprising a positional servo-linking arrangement, the angular rotation detected being transmitted to a controlled oscillator which delivers said signal to control the deflector, and means for stepping-down the rotation of the mirror in a ratio according to the said ratio controlling the servo-linking arrangement, to drive the modulating and retro-reflecting set.

3. A system according to the claim 1, wherein the catadioptric device is made by means of a divergent lens and a spherical mirror.

4. A system according to the claim 1, comprising another acousto-optical deflector upstream of the deflector, the said acousto-optical deflector being controlled at a fixed frequency to increase the field covered.

5. A system according to the claim 1, wherein the deflector control circuit comprises a generator of saw-toothed signals, the output of which controls a controlled oscillator which produces the control signal of the deflector, the said signal being applied to the said deflector by means of a piezo-electric element.

6. A system according to the claim 1, wherein the laser transmitter/receiver is borne by a first structure and the retro-reflecting and modulating set is borne by a second structure, at least one of the two structures being mobile with respect to the other, the system further comprising a second catadioptric device to send back a part of the laser radiation by retro-reflection, without modifying this radiation, so as to obtain a reference to assess the Doppler frequency shift caused by the relative motion of the said structures.

7. A system according to the claim 1, wherein the receiver comprises an optical mixing circuit to produce the beating of the transmission laser wave with the laser wave received by retro-reflection and a processing circuit with a spectrum analyzer to extract the frequency shift, equal to twice the frequency of the deflector control signal, and to deduce from it, by calculation, the shift of the laser beam axis with respect to the normal line at the acousto-optical deflector.

8. A system of identification using a laser beam retro-reflecting and modulating device, said system comprising:
   a retro-reflecting and modulating set having an acousto-optical deflector which periodically receives an electrical signal from a control circuit of a frequency to obtain a diffraction of a radiation beam in accordance with operating conditions of Bragg's law, said deflector being mechanically coupled with a catadioptric device placed downstream to receive the radiation beam and to send back a diffracted radiation beam in the same direction and, after this radiation has passed through the deflector in the reverse direction, to produce a retro-reflection of the radiation beam, the retro-reflection having a frequency shift with a value equal to twice a frequency of said control signal;

a mechanically separate laser transmitter/receiver set which is placed remotely from said retro-reflecting and modulating set and receives said retro-reflection therefrom, the transmitter producing a radiation in the direction of said retro-reflecting and modulating set and the receiver comprising circuits for detection and processing of said retro-reflection sent back from said retro-reflection and modulation set;

an optical scanning device for scanning a determined range in one plane, comprising a rotating, reflecting mirror, rotating on an axis orthogonal to said one plane; and an optical deviating device servo-linked to the rotation of a mirror, according to a determined ratio of a type which (a) makes it possible to preserve the diffraction conditions of Bragg's law, and (b) makes it possible to determine a deviation from a reference plane, is placed at the entry of the deflector to make the radiation deviate.

9. A system according to the claim 8, further comprising a positional servo-linking arrangement, the angular rotation detected by a sensor being transmitted to a controlled oscillator which delivers said control signal of the deflector, and means for stepping-down the rotation of the mirror in said ratio to drive the said optical deviating device.

10. A system of identification using a laser beam retro-reflecting and modulating device, said system comprising:

a retro-reflecting and modulating set having an acousto-optical deflector which periodically receives an electrical signal from a control circuit, of a frequency to obtain a diffraction of a radiation beam in accordance with operating conditions of Bragg's law, said deflector being mechanically coupled with a catadioptric device placed downstream to receive the radiation beam and to send back a diffracted radiation beam in the same direction and, after this radiation has passed through the deflector in the reverse direction, to produce a retro-reflection of the radiation beam, the retro-reflection having a frequency shift with a value equal to twice a frequency of said control signal;

a mechanically separate laser transmitter/receiver set which is placed remotely from said retro-reflecting and modulating set and receives said retro-reflection therefrom, the transmitter producing a radiation in the direction of said retro-reflecting and modulating set and the receiver comprising circuits for detection and processing of said retro-reflection sent back from said retro-reflection and modulation set; and an optical scanning device, upstream of said optical deflector device;

the scanning device comprising a turret with two degrees of freedom to perform spatial exploration by rotation on two orthogonal axes which correspond to an azimuthal circular axis and an elevation axis respectively, wherein the frequency applied to the deflector is linked, by a determined ratio of a type which (a) makes it possible to preserve the diffraction conditions of Bragg's law, and (b) makes it possible to determine a deviation from a reference plane, to the pair of angular values of rotation, said control circuit preparing the signal at the corresponding frequency in accordance with the angular values of rotation detected.

11. A system as in any of claims 1, 8, or 10 wherein said ratio is between changes in angle of the retro-reflecting and modulating set $\Delta\theta_B/\Delta$ changes in angle of the mirror $\Delta 1$ equals $$\frac{\Delta\theta_B}{\Delta 1} = \frac{(\text{lambda})}{V} \cdot \frac{K}{\sqrt{1 - (\text{lambda } F_o/2V)^2}}$$

12. A system as in claim 11 wherein the catadioptric device is a reflecting corner cube.

13. A system of identification using a laser beam retro-reflecting and modulating device, said system comprising:

a retro-reflecting and modulating set having an acousto-optical deflector which periodically receives an electrical signal from a control circuit, of a frequency of said electrical signal to obtain a diffraction of a radiation beam in accordance with operating conditions of Bragg's law, said deflector being mechanically coupled with a catadioptric device placed downstream to receive the radiation beam and to send back a diffracted radiation beam in the same direction and, after this radiation has passed through the deflector in the reverse direction, to produce a retro-reflection of the radiation beam, the retro-reflection having a frequency shift with a value equal to twice a frequency of said control signal, and a mechanically separate laser transmitter/receiver set which is placed remotely from said retro-reflecting and modulating set and receives said retro-reflection therefrom, the transmitter producing a radiation in the direction of said retro-reflecting and modulating set and the receiver comprising circuits for detection and processing of said retro-reflecting sent back from said retro-reflection and modulation set; wherein the receiver further comprises an optical mixing circuit to produce the beating of the transmission laser wave with the laser wave received by retro-reflection and a processing circuit with a spectrum analyzer to extract the frequency shift, equal to twice the frequency of the deflector control signal, and to obtain from it, by calculation, the shift of the laser beam axis with respect to the normal line at the acoustic-optical deflector, wherein the receiver produces the extraction of the value of the frequency shift in the received laser beam, this extraction being obtained by temporal measurement, in controlling the oscillator by a periodic, symmetrical, saw-toothed signal.

14. A system according to any of claims 1-2, 8-10 or 13 wherein the catadioptric device is a reflecting corner cube.

15. A system of identification using a laser beam retro-reflecting and modulating device, said system comprising:

a retro-reflecting and modulating set having an acousto-optical deflector which periodically receives an electrical signal from a control circuit, of a frequency of said electrical signal to obtain a diffraction of a radiation beam in accordance with operating conditions of Bragg's law, said deflector being mechanically coupled with a catadioptric device placed downstream to receive the radiation beam and to send back a diffracted radiation beam in the same direction and, after this radiation has passed through the deflector in the reverse direction, to produce a retro-reflection of the radiation beam, the retro-reflection having a frequency shift with a value equal to twice a frequency of said control signal;

a mechanically separate laser transmitter/receiver set which is placed remotely from said retro-reflecting and modulating set and receives said retro-reflection therefrom, the transmitter producing a radiation in the direction of said retro-reflecting and modulating set and the receiver comprising circuits for detection and processing of said retro-reflection sent back from said retro-reflection and modulation set; and an optical scanning device, upstream of said optical deflector device; the scanning device comprising a turrent with two degrees of freedom to perform spatial exploration by rotation on two orthogonal axes which correspond to an azimuthal circular axis and an elevation axis respectively, wherein the catadioptric device is a reflecting corner cube.

* * * * *